(12) United States Patent
van den Oord et al.

(10) Patent No.: US 11,966,839 B2
(45) Date of Patent: Apr. 23, 2024

(54) AUTO-REGRESSIVE NEURAL NETWORK SYSTEMS WITH A SOFT ATTENTION MECHANISM USING SUPPORT DATA PATCHES

(71) Applicant: DeepMind Technologies Limited, London (GB)

(72) Inventors: Aaron Gerard Antonius van den Oord, London (GB); Yutian Chen, Cambridge (GB); Danilo Jimenez Rezende, London (GB); Oriol Vinyals, London (GB); Joao Ferdinando Gomes de Freitas, London (GB); Scott Ellison Reed, New York, NY (US)

(73) Assignee: DeepMind Technologies Limited, London (GB)

( * ) Notice: Subject to any disclaimer, the term of this patent is extended or adjusted under 35 U.S.C. 154(b) by 665 days.

(21) Appl. No.: 16/758,461

(22) PCT Filed: Oct. 25, 2018

(86) PCT No.: PCT/EP2018/079241
§ 371 (c)(1),
(2) Date: Apr. 23, 2020

(87) PCT Pub. No.: WO2019/081623
PCT Pub. Date: May 2, 2019

(65) Prior Publication Data
US 2020/0250528 A1    Aug. 6, 2020

Related U.S. Application Data

(60) Provisional application No. 62/577,114, filed on Oct. 25, 2017.

(51) Int. Cl.
*G06N 3/08* (2023.01)
*G06N 20/00* (2019.01)

(52) U.S. Cl.
CPC ............... *G06N 3/08* (2013.01); *G06N 20/00* (2019.01)

(58) Field of Classification Search
CPC ................... G06N 3/08; G06N 20/00
See application file for complete search history.

(56) References Cited

U.S. PATENT DOCUMENTS 6,601,052 B1 * 7/2003 Lee ...................... G06N 3/0454
706/14
9,129,190 B1 * 9/2015 Ranzato ................. G06V 10/82
(Continued)

FOREIGN PATENT DOCUMENTS

CA      2963808         10/2017
CA      2963808 A1 *    10/2017    ......... G06K 9/00409
(Continued)

OTHER PUBLICATIONS

Andrychowicz et al., "Learning to learn by gradient descent by gradient descent," CoRR, Jun. 2016, https://arxiv.org/abs/1606.04474v2, 17 pages.
(Continued)

*Primary Examiner* — Douglas M Slachta
(74) *Attorney, Agent, or Firm* — Fish & Richardson P.C.

(57) ABSTRACT

A system comprising a causal convolutional neural network to autoregressively generate a succession of values of a data item conditioned upon previously generated values of the data item. The system includes support memory for a set of support data patches each of which comprises an encoding of an example data item. A soft attention mechanism attends to one or more patches when generating the current item value. The soft attention mechanism determines a set of scores for the support data patches, for example in the form of a soft attention query vector dependent upon the previously generated values of the data item. The soft attention query vector is used to query the memory. When generating
(Continued)

the value of the data item at a current iteration layers of the causal convolutional neural network are conditioned upon the support data patches weighted by the scores.

17 Claims, 4 Drawing Sheets

(56) References Cited

U.S. PATENT DOCUMENTS

| | | | | |
|---|---|---|---|---|
| 10,354,168 | B2* | 7/2019 | Bluche | G06V 30/333 |
| 10,503,998 | B2* | 12/2019 | Harron | G06V 30/148 |
| 2017/0103532 | A1* | 4/2017 | Ghesu | A61B 5/7264 |
| 2017/0177972 | A1* | 6/2017 | Cricri | G06N 3/0445 |
| 2017/0200076 | A1* | 7/2017 | Vinyals | G06N 3/0454 |
| 2017/0228643 | A1* | 8/2017 | Kurach | G06N 3/08 |
| 2017/0262996 | A1* | 9/2017 | Jain | G06K 9/628 |
| 2017/0344876 | A1* | 11/2017 | Brothers | G06N 3/082 |
| 2018/0005082 | A1* | 1/2018 | Bluche | G06N 3/0445 |
| 2018/0114109 | A1* | 4/2018 | Li | G06N 3/0481 |
| 2018/0144208 | A1* | 5/2018 | Lu | G06F 18/24133 |
| 2018/0373997 | A1* | 12/2018 | Duan | G06N 3/006 |
| 2019/0066110 | A1* | 2/2019 | Shen | G06K 9/6271 |
| 2019/0130250 | A1* | 5/2019 | Park | G06F 17/15 |
| 2021/0027425 | A1* | 1/2021 | Kalchbrenner | G06N 20/00 |
| 2021/0133436 | A1* | 5/2021 | Flament | G06F 18/214 |

FOREIGN PATENT DOCUMENTS

| | | |
|---|---|---|
| EP | 3166049 | 5/2017 |
| WO | WO 2017/132288 | 8/2017 |

OTHER PUBLICATIONS

Bachman et al., "Learning Algorithms for Active Learning," CoRR, Jul. 2017, https://arxiv.org/abs/1708.00088, 10 pages.
Bahdanau et al., "Neural Machine Translation by Jointly Learning to Align and Translate," https://arxiv.org/abs/1409.0473v1, Sep. 2014, 15 pages.
Bartunov et al., "Fast Adaptation in Generative Models with Generative Matching Networks," CoRR, Dec. 2016, https://arxiv.org/abs/1612.02192v1, 12 pages.
Bornschein et al., "Variational Memory Addressing in Generative Models," CoRR, Sep. 2017, https://arxiv.org/abs/1709.07116, 12 pages.
Chen et al., "Learning to Learn for Global Optimization of Black Box Functions," CoRR, Nov. 2016, https://arxiv.org/abs/1611.03824v3, 12 pages.
Deng et al., "Imagenet: A large-scale hierarchical image database," 2009 IEEE Conference on Computer Vision and Pattern Recognition, Jun. 2009, pp. 248-255.
Duan et al., "One-Shot Imitation Learning," CoRR, Mar. 2017, https://arxiv.org/abs/1703.07326v1, 23 pages.
Finn et al., "Model-agnostic meta-learning for fast adaptation of deep networks," Proceedings of the 34th International Conference on Machine Learning, Aug. 2017, 10 pages.
Finn et al., "One-Shot Visual Imitation Learning via Meta-Learning," CoRR, Sep. 2017, https://arxiv.org/abs/1709.04905, 12 pages.
Gehring et al., "Convolutional Sequence to Sequence Learning," CoRR, May 2017, https://arxiv.org/abs/1705.03122v3, 15 pages.
Gregor et al., "DRAW: A Recurrent Neural Network for Image Generation," CoRR, Feb. 2015, https://arxiv.org/abs/1502.04623v2, 10 pages.
Gregor et al., "Towards conceptual compression," Advances in Neural Information Processing Systems 29 (NIPS 2016), Dec. 2016, 9 pages.
Harlow, "The Formation of Learning Sets," Psychological Review, Jan. 1949, 56(1):51-65.

Hochreiter et al., "Learning to Learn Using Gradient Descent," International Conference on Artificial Neural Networks, Aug. 2001, pp. 87-94.
http://www.scottreed.info [online], "Text- and Structure-Conditional PixelCNN," May 19, 2017, retrieved on Sep. 4, 2020, retrieved from URL<http://www.scottreed.info/files/txtstruct2pixel.pdf>, 13 pages.
Lake et al., "One-shot learning by inverting a compositional causal process," Advances in Neural Information Processing Systems 26 (NIPS 2013), 2013, 9 pages.
Learning to Learn: Introduction and Overview, 1998, Chapter 1.1, pp. 3-17.
Neu et al., "Apprenticeship Learning using Inverse Reinforcement Learning and Gradient Methods," CoRR, Jun. 2012, https://arxiv.org/abs/1206.5264, pp. 295-302.
PCT International Preliminary Report on Patentability in International Appln. No. PCT/EP2018/079241, dated May 7, 2020, 15 pages.
PCT International Search Report and Written Opinion in International Appln. No. PCT/EP2018/079241, dated Feb. 12, 2019, 23 pages.
Ravi et al., "Optimization as a Model for Few-Shot Learning," ICLR, 2017, 11 pages.
Reed et al., "Few-shot Autoregressive Density Estimation: Towards Learning to Learn Distributions," CoRR, Oct. 2017, https://arxiv.org/abs/1710.10304v1, 11 pages.
Reed et al., "Generative Adversarial Text to Image Synthesis," CoRR, May 2016, https://arxiv.org/abs/1605.05396v2, 10 pages.
Reed et al., "Parallel Multiscale Autoregressive Density Estimation," CoRR, Mar. 2017, https://arxiv.org/abs/1703.03664, 16 pages.
Reed et al., "Text- and Structure-Conditional PixelCNN," Technical Report, retrieved from URL <http://www.scottreed.info/files/txtstruct2pixel.pdf>, 13 pages.
Rezende et al., "One-Shot Generalization in Deep Generative Models," CoRR, Mar. 2016, https://arxiv.org/abs/1603.05106v2, 10 pages.
Santoro et al., "A simple neural network module for relational reasoning," CoRR, Jun. 2017, https://arxiv.org/abs/1706.01427, 16 pages.
Santoro et al., "Meta-learning with memory-augmented neural networks," Proceedings of the 33rd International Conference on International Conference on Machine Learning, Jun. 2016, 9 pages.
Shyam et al., "Attentive Recurrent Comparators," CoRR, Mar. 2017, https://arxiv.org/abs/1703.00767, 9 pages.
Smith et al., "The Development of Embodied Cognition: Six Lessons from Babies," Artificial Life, 2005, 11(1-2):13-29.
Song et al., "Deep Metric Learning via Lifted Structured Feature Embedding," 2016 IEEE Conference on Computer Vision and Pattern Recognition (CVPR), Jun. 2016, 4004-4012.
Spelke et al., "Core knowledge," Developmental Science, 2007, 10(1):89-96.
Van den Oord et al., "Conditional Image Generation with PixelCNN Decoders," Advances in Neural Information Processing Systems 29 (NIPS 2016), Dec. 2016, 9 pages.
Van den Oord et al., "Pixel Recurrent Neural Networks," CoRR, Jan. 2016, https://arxiv.org/abs/1601.06759, 11 pages.
Van den Oord et al., "Conditional Image Generation with PixelCNN Decoders," CoRR, Jun. 2016, https://arxiv.org/abs/1606.05328v2, 13 pages.
Van den Oord et al., "WaveNet: A Generative Model for Raw Audio," CoRR, Sep. 2016, https://arxiv.org/abs/1609.03499v2, 15 pages.
Vinyals et al., "Matching Networks for One Shot Learning," CoRR, Jun. 2016, https://arxiv.org/abs/1606.04080v1, 12 pages.
Xu et al., "Show, Attend and Tell: Neural Image Caption Generation with Visual Attention," Proceedings of the 32nd International Conference on Machine Learning, 2015, 37: 10 pages.
Office Action in European Appln. No. 18795487.0, dated Jul. 20, 2022, 14 pages.

* cited by examiner

AUTO-REGRESSIVE NEURAL NETWORK SYSTEMS WITH A SOFT ATTENTION MECHANISM USING SUPPORT DATA PATCHES

CROSS-REFERENCE TO RELATED APPLICATIONS

This application is a National Stage Application under 35 U.S.C. § 371 and claims the benefit of International Application No. PCT/EP2018/079241, filed Oct. 25, 2018, which claims priority to U.S. Application No. 62/577,114, filed Oct. 25, 2017, the entire contents of which are hereby incorporated by reference herein.

BACKGROUND

This specification relates to neural network systems which are capable of generating a data item based on just a few previous examples.

Neural networks are machine learning models that employ one or more layers of nonlinear units to generate an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that, in some implementations, is capable of learning to generate a data item from just a few examples. In broad terms the system is autoregressive in that it generates values of the data item dependent upon previously generated values of the data item. However the system also employs a soft attention mechanism which enables attention-controlled context for the generated data item values. Thus rather than the context for the data item generation being the same for all the generated item values it depends upon the item value being generated, and more particularly the context is controlled by the previous item values generated. The context for generating the item values may be provided from a support memory which may, for example, store examples relevant to the data item values being generated.

The data item may be an item representing a still or moving image, in which case values of the data item may represent pixel values, for example values of one or more color channels of the pixels. Alternatively the data item may be an item representing a sound signal, for example amplitude values of an audio waveform. Or the data item may be an item representing text data, for example a text string or other representation of words and/or sub-word units (wordpieces or characters) in a machine translation task. Thus the data item may be one, two, or higher-dimensional.

An advantage of implementations of the system is that (once trained) it can be used to generate a data item based on just one or a few support data items which are provided to the system, and which condition the generation of the data item.

The data item may be also generated conditioned upon an additional data input to the system defining a target for generating the data item. The additional data may represent the same or a different type or modality of data to the generated data item. For example, when trained to generate image data the additional data may define a label or class of one of the images and the generated data item may then comprise an example image of that type (e.g., African elephant). Or the additional data may comprise an image or an encoding of an image, and the generated data item may define another similar image—for example when trained on images of faces the system target data may comprise an encoding of a person's face and may then generate a data item representing a similar face with a different pose/lighting condition. Or the additional data may comprise a text string or spoken sentence, or an encoding of these, and the system may generate an image corresponding to the text or speech (text to image synthesis), or vice-versa. Alternatively the additional data may comprise a text string or spoken sentence, or an encoding of these, and the system may then generate a corresponding text string or spoken sentence in a different language. The system may also generate video autoregressively, in particular given one or more previous video frames.

The system may generate sound data, for example speech, in a similar way. This may be conditioned upon audio data and/or other data such as text data. In general the additional data may define local and/or global features of the generated data item. For example for audio data global features (the same for every value in a sequence) may comprise information defining the sound of a particular person's voice, or a speech style, or a speaker identity, or a language identity; local features may comprise linguistic features derived from input text, optionally with intonation data.

In another example the additional data may define motion or state of a physical object, for example actions and/or states of a robot arm. The system may then be used to generate a data item predicting a future image or video sequence seen by a real or virtual camera associated with the physical object. In such an example the target data may include one or more previous image or video frames seen by the camera. This data can be useful for reinforcement learning, for example facilitating planning in a visual environment. More generally because the system learns to encode a probability density which may be used directly for probabilistic planning/exploration.

In still further examples the system may be employed for image processing tasks such as de-noising, de-blurring, image completion and the like by employing additional data defining a noisy or incomplete image; for image modification tasks by employing additional data defining a modified image; and for image compression, for example when the system is used in an autoencoder. The system may similarly be used to process items representing other than images.

Thus in one innovative aspect a neural network system is implemented on one or more computers for generating a data item. The neural network system may comprise a masked i.e. causal convolutional neural network to iteratively generate a succession of values of a data item, which may be an output data item, conditioned upon previously generated values of the data item. More particularly the causal convolutional neural network may be configured to generate a data item by, at each of a plurality of iterations, generating a value of the data item, such as a pixel value or sound signal/waveform value, conditioned upon values of the data item previously generated at previous iterations.

The system may further comprise a support memory to store context for the generated item values, more particularly data representing a set of support data patches for generating the data item. A support data patch may comprise data for use in generating a current data item value; it may comprise an encoding of all or part of a data item which is an example of the data item to be generated.

A soft attention mechanism may be provided to attend to one or more suitable patches for use in generating the current data item value. Thus the soft attention mechanism may determine a set of weightings or scores for the support data patches, for example in the form of a soft attention query vector (e.g. $\alpha_{ij}$ later) dependent upon the previously generated values of the data item. The soft attention query vector may then be used to query the memory for generating a value of the data item at a current iteration. When generating the value of the data item at the current iteration one or more layers of the causal convolutional neural network may be conditioned upon the support data patches weighted by the scores. The support data patches typically each comprise an encoding of supporting data for generating the data item, and the encodings may be combined weighted by the scores.

In broad terms this allows some implementations of the system to generate data items based on very small numbers of examples, for example less than ten examples as compared with the thousands which are normally needed. The support memory and context-sensitive attention mechanism facilitates the system identifying relevant supporting data in the memory when generating a data item value.

Here the reference to a causal convolution means that the generated data item values depend on previously generated data item values but not on future data item values. In the context of a convolutional neural network layer operating on a data sequence this can be implemented, for example, by the use of one or more masks to mask input(s) to a convolution operation from data item values in a sequence following those at a current time or iteration step of the sequence. Additionally or alternatively a causal convolutional may be implemented by applying a normal convolution then shifting the output by a number of time or iteration steps, in particular shifting the output forward by (filter length−1) steps prior to applying an activation function for the convolutional layer, where "filter length" is the length of the filter of the convolution that is being applied.

In some implementations of the system the stored support data patches each have a support data patch key ($p^{key}$). The support data patch key may facilitate learning a score relating the value of the data item to be generated at an iteration to a supporting patch. For example the soft attention mechanism may be configured to combine an encoding of the previously generated values of the data item ($q_r$; upon which the current data item value depends), with the support data patch key for each of the support data patches, to determine the set of scores for the soft attention query vector. The encoding of the previously generated values of the data item may comprise a set of features from a layer of the causal convolutional neural network. In broad terms a set of scores links the generation of a current value for the data item, e.g. a current pixel or waveform value, with a set of keys identifying the best support data patches for generating the value. The scores may be normalized.

In some implementations of the system the support data patches each also have a support data patch value ($p^{value}$) encoding the content of the support data patch. A support data patch value may be generated by a neural network such as a convolutional neural network. The support data patch value may encode part or all of a support data item. A support data item may correspond to a training example. For example in the case of an image of an object different support data items may show the object from different angles or under different lighting conditions. There may be one or more support data patches per data item. For example in the case of an image a support data patch may comprise a complete encoded example image and/or one or more encoded image regions; the regions may correspond to feature maps of a convolutional neural network. The iteratively generated successive values of the data item define successive respective "positions" associated with the values of the data item, where the positions may be spatial, temporal or conceptual; the support data patches typically span a range of such positions. The support data patches may be thought of as encodings of relevant "textures" which may be used by the system when generating the data item. The system may have an input to receive one or more support data items, for example for use (after training) when generating a new data item based on one or more newly presented support set data items.

In some implementations a soft attention mechanism may be coupled to each of a plurality of layers of the causal convolutional neural network above a starting layer, which may be a first or higher layer.

As previously described, the support data patches may encode data from one or more support data items. The support data items may comprise a plurality of data elements, for example pixels of an image or samples of a sound, and the support data patches may further encode relative positions of these data elements, for example in space or time, within a support data item. For example one or more channels of information may be added to one or more channels of data element values, to define the positions of the data elements prior to encoding. For example in an image support data item channels for pixel x- and y-positions may be added to one or more pixel value channels. The position information may be normalized, for example to [−1, 1]. Encoding such position information in the support data patches can facilitate use of the encoded information when generating data item values.

The support data patches may additionally or alternatively encode a label or other identifier of a support data item, or of an example to which a set of support data items corresponds. The label may, for example, comprise a 1 of N channel labelling an object from which multiple patches or data items are derived, for example corresponding to different views of the object.

The iterative generation of a succession of values of the data item may involve generating a sequence of values at a single scale or may involve multiscale data item generation. For example a data item such as an image may be split into disjoint groups of pixels, preferably with no two pixels in the same group adjacent. Inference may then proceed sequentially over groups and in parallel within each group. For example, given a first group of data item, say pixel, values, the rest of the groups at a given scale may be generated autoregressively. The first group of values can be upscaled from a lower resolution; the base resolution can be modelled, for example, as described later, using a PixelCNN network (Reed et al., "Parallel multiscale autoregressive density estimation", Proc. 34th International Conference on Machine Learning, 2017). Thus in multiscale item generation data item values may be generated, conditioned dependent upon data item values from previously generated groups of values, including previously-generated lower resolutions, but the above-described approach involving a soft attention mechanism may be essentially unchanged.

As previously mentioned, the data item may be generated conditioned upon an additional data input to the system defining a target for generating the data item. This may comprise a simple one-hot encoding of a target or a neural network encoding of the target data. One or more layers of the causal convolutional neural network may thus be further conditioned upon such additional feature data, which may define global and/or local features for the data item. Preferably the support data patches are derived from one or more example data items of the target type. As previously described, such additional data may comprise image, video, sound, text, and/or object position/state/action data, and/or an encoding thereof.

The data item may comprise, without limitation, comprises one or more of: pixel values of a still or moving image, for example brightness/luminance and/or color values such as red/green/blue values; audio item values such as amplitude values, and values representing a text string.

The causal convolutional neural network may define a distribution for each generated value of the data item. This may then be used to generate values for the data item by sampling from the distribution, for example selecting a most-likely value. Thus the system may include a selection module to select values for the data item and to provide the selected values for the causal convolutional neural network to use in a subsequent iteration. An output layer of the causal convolutional neural network, for example a softmax output layer, may thus comprise a set of outputs, one representing a probability of each value. Alternatively the output may be represented in some other manner, for example as a continuous mixture model.

Layers of the causal convolutional neural network may, but need not be resolution-preserving. In some implementations, for example when generating a sound sample, a layer may be dilated, for example only one of every n outputs from a previous layer may be connected to an input; or convolutional downsampling may be employed. The causal convolutional neural network may include residual connections, for example a connection from an input of a convolutional layer to a summer to sum this with an intermediate output of the layer effectively allowing the network to skip or partially skip a layer. The convolutional subnetwork may additionally or alternatively comprise skip connections, for example directly from an intermediate layer to the output layer.

Although in many cases the system may be used to generate data item values, the system also has other uses. For example a probability density model learned by the system may be used directly to control state space exploration in a reinforcement learning system; or to evaluate or classify an item such as an image, sound or machine translation. Thus it is not essential that the system is used generate a data item.

Thus in another innovative aspect a method of training a neural network system to encode a probability density estimate for a data item comprises training a convolutional neural network to iteratively generate a succession of values of a data item conditioned upon previously generated values of the data item. The training encodes a probability density estimate for the data item in weights of the causal convolutional neural network, and may further comprise encoding support data from input data provided to the system representing (defining) one or more examples of a target, e.g. output data item for the neural network system. The training may further comprise encoding a combination of the encoded support data, and local context data derived from the previously generated values of the data item, to determine an attention-controlled context function (e.g. $f_t(s, x_{<t})$ later). The method may then include conditioning one or more layers of the convolutional neural network upon the attention-controlled context function, thus encoding a probability density estimate in which the estimate for a training iteration is controlled by the previously generated values of the data item controlling a soft attention function to direct attention towards, and hence gather information from, relevant context from the encoded support data.

The method may include storing the encoded support data in memory coupled to the convolutional neural network, and querying the stored encoded support data using the attention-controlled context function. Determining the attention-controlled context function may comprise learning a scoring function matching the local context data with the support data.

In some implementations of the method the encoded probability density estimate may be used to generate values for a further, new data item sampled from or predicted by the encoded probability density estimate.

The method may involve, after training, generating values for a further data item based on the learned parameters of the system, in particular by encoding one or more previously unseen support data items using a learned encoding and using the attention-controlled context function to attend to the new, encoded support data items to condition the convolutional neural network when generating the further data item.

The subject matter described in this specification can be implemented in particular embodiments so as to realize one or more of the following advantages.

The described systems and methods can generate data items such as image or sound data items with accuracies comparable to systems requiring thousands of examples and hundreds of thousands of training steps, but based on just a few examples. They can estimate probability density from just a few examples in a similar manner. Thus the described systems and methods can generate a data item, such as an image or sound waveform, faster and with less processing, memory and power requirements than a system needing many examples. More specifically, although the systems and methods need to be trained, once trained they can effectively use just one or a few examples to perform a task such as generating a new data item of the same type, or processing a data item. The structure of the described systems facilitates rapid initial training. In addition the attention mechanism appears to allow the systems and methods to perform tasks that previous systems were incapable of doing well or at all, such as learning to generate a mirrored version of an image when trained to reproduce an image conditioned on the mirrored image. In general the system is able to produce high quality data items in a computationally efficient manner.

Example applications are described elsewhere in this specification, but include the generation of images and sound waveforms which may be conditioned on additional external data. This allows data items to be generated representing the external data, for example speech waveforms or images representing text or other input, and images or other data items representing a prediction based on an external input defining a future state of a mechanical or industrial control task e.g. for use as a prediction component in a control loop.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations the systems described in this specification, after training, are able to use one or a just few examples similar to those in a training set to perform a task. The task might be, say, to generate another example, or in the case of an image to flip the image about an axis. In broad terms an autoregressive model is trained to perform the task on a set of similar examples and is then able to perform the task for a new example or examples. Suitable autoregressive models include but are not limited to those previously described for generating images, e.g Reed et al., "Parallel multiscale autoregressive density estimation", Proc. 34th International Conference on Machine Learning, 2017) and sound, e.g A. van den Oord et al. "WaveNet: A generative model for raw audio" arXiv 1609:03499. In the following image generation will be used to describe an implementation of the system but use of the described techniques, and in particular the attention mechanism, is not limited to images but can be applied to any data which can be represented as a sequence, nor are the techniques limited to the example model.

The autoregressive "PixelCNN" model (ibid) will be described as an example autoregressive model. This is trained to generate the pixels of an image in sequence, for example in a raster scan row by row and pixel by pixel. A conditional version of the PixelCNN model has been described in Aaron van den Oord et al., "Conditional Image Generation with PixelCNN Decoders", arXiv: 1606.05328. This determines a probability distribution:

$$P(x|s;\theta) = \prod_{t=1}^{N} P(x_t | x_{<t}, f(s); \theta)$$

where a probability distribution for each pixel value $x_t$ is determined dependent upon all the previously generated pixel values $x_{<t}$ for N image pixels. Where a color image is generated each color may also be conditioned on any previously generated color channel values for the pixel. In the above equation θ are the model parameters (weights) and the model is conditioned on a conditioning variable s where $f$ is a function encoding a conditioning variable s.

Figure 1:
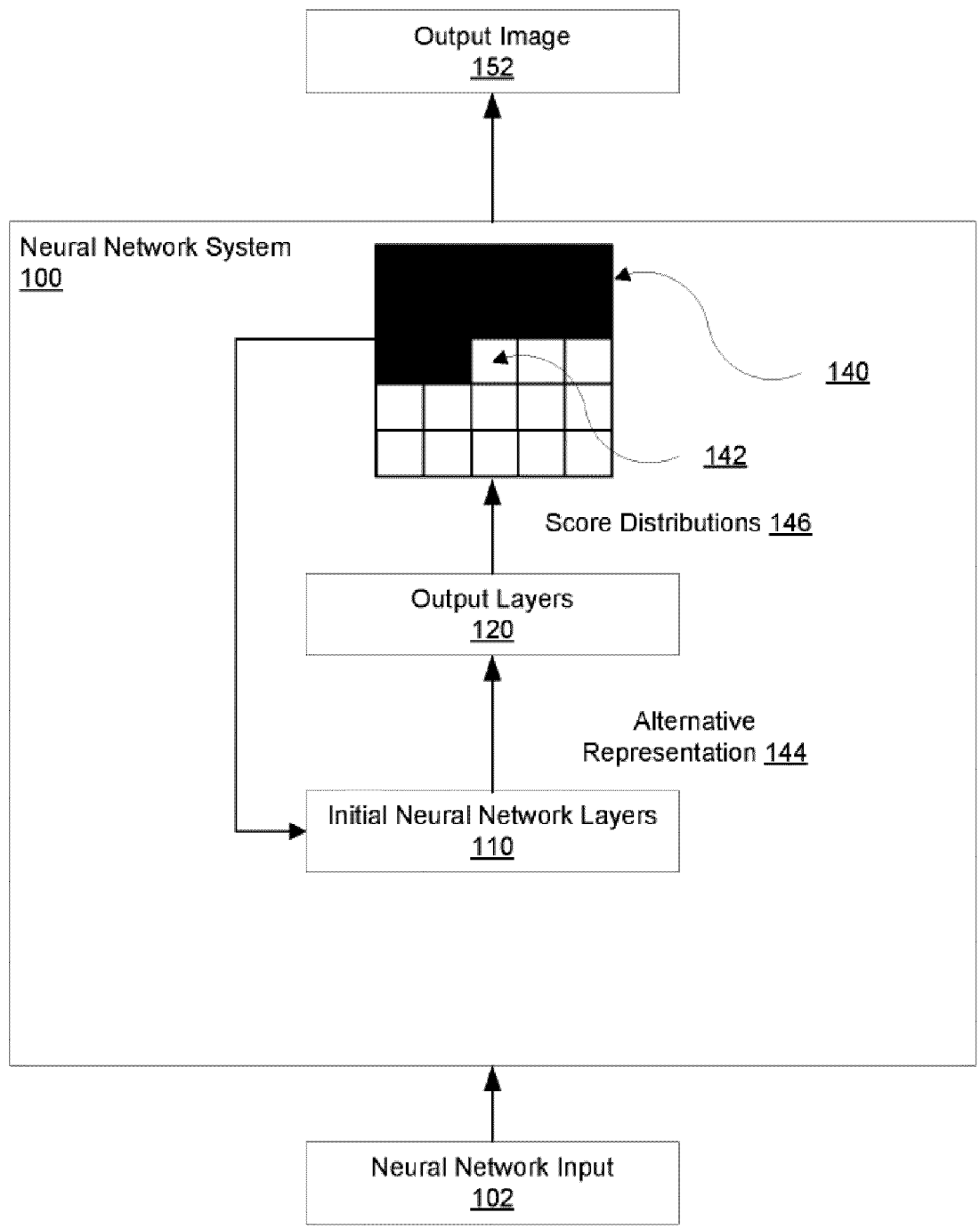
FIG. 1 shows an example autoregressive neural network system.

Referring to FIG. 1, which is taken from WO2017/132288, this shows an example autoregressive neural network system 100. The neural network system 100 receives a neural network input 102 and generates an output image 152 from the neural network input. The neural network system 100 can be used for generating new images that have similar features to images on which the system was trained. For example for image generation, during training the neural network input can be an image and the neural network system 100 may generate an output image that is a reconstruction of the input image. After training, the neural network system 100 may generate an output image pixel by pixel without being conditioned on an input. Merely by way of example a system to generate a color image will be described but similar systems may be employed to generate a monochrome image, or sound data.

Thus in this example, for a given input, the neural network system 100 generates an output image that includes a predetermined number of pixels arranged in a two-dimensional map. Each pixel has a respective color value for each of multiple color channels e.g. a red color channel, a green color channel, and a blue color channel. The multiple color channels are arranged according to predetermined order, e.g., red, green, and then blue.

Generally, the neural network system 100 generates the color values in the output image pixel by pixel in a sequence of pixels taken from the output image. That is, the neural network system 100 orders the pixels in the output image into a sequence and then generates the color values for each pixel in the output image one by one in order according to the sequence.

For example, the sequence may start at the top left corner of the output image and proceed row by row through the output image, with the last pixel in the sequence being the pixel in the bottom right corner of the output image. In this example, the neural network system 100 first generates the color values for the top left corner pixel and then proceeds to the next pixel in the top row of the image.

In particular, for a given color channel of a given pixel in the output image, the neural network system 100 generates the color value for the color channel of the given pixel conditioned on (i) color values for pixels before the pixel in the sequence and (ii) color values for the pixel for any color channels before the color channel in the order of color channels. During training, because the output image is a reconstruction of the neural network input, i.e., the input image, these color values can be taken from the corresponding pixels in the input image rather than from the output image. Training can therefore be performed in parallel because during training all the pixels of a training image are available and the pixel predictions can therefore be made in parallel.

The neural network system 100 includes one or more initial neural network layers 110 and one or more output layers 120.

After a given color value for a given color channel of a given pixel in the output image has been generated, the initial neural network layers 110 are configured to process the current output image, i.e., the output image that includes the color values that have already been generated for the output image, to generate an alternative representation 144 of the current output image 140. As shown in FIG. 1, the shaded portion of the current output image 140 denotes pixels for which color values have already been generated by the neural network system 100, while the unshaded portion of the current output image 140 denotes pixels for which color values have not already been generated.

The one or more output layers 120 receive the alternative representation and generate a score distribution over a discrete set of possible color values for the next color channel in the image. For example, the discrete set of possible color values can be the set of integers from zero to two hundred fifty-five, inclusive, with the score distribution including a respective score for each of the integers in the set. The scores in the score distribution can represent, for each possible pixel value, the likelihood, e.g., the probability, that the pixel value should be the value of the given color channel for the task that the system is configured to perform.

If the given color channel referenced above is the last color channel in the predetermined ordering of color channels, the output layers 120 generate a score distribution for the first color channel in the next pixel in the sequence after the given pixel. In the example of FIG. 1, the output layers 120 generate a score distribution 146 for the first color channel of a next pixel 142 in the output image 140.

If the given color channel referenced above is not the last color channel in the predetermined ordering, the output layers 120 generate a score distribution for the next color channel after the given color channel in the order of color channels for the given pixel. For example, if the order of the color channels is red, green, and then blue and the last color value generated was for the green color channel of the given pixel, the score distribution generated by the output layers 120 is the score distribution for the blue color channel of the given pixel.

In some implementations, the neural network system 100 includes a single output layer, e.g., a single softmax layer, that generates the score distributions for all of the color channels. In some other implementations, the neural network system 100 includes a respective output layer, e.g., a respective softmax layer, corresponding to each of the color channels, and each output layer generates the score distribution for the corresponding color channel.

The alternative representation may be a feature map that includes features for each color channel of each pixel in the output image. In these implementations, when generating the color value for a given channel of a given pixel, the output layer uses the corresponding portion of the alternative representation, i.e., uses the portion of the alternative representation that includes the features of the given color channel of the given pixel.

The neural network system 100 then selects a value for the current color channel, i.e., either the first color channel in the next pixel in the sequence after the given pixel or the next color channel after the given color channel in the order of color channels for the given pixel, from the generated score distribution. For example, the neural network system 100 can sample a color value in accordance with the score distribution or select the highest-scoring color value according to the score distribution.

The initial neural network layers 110 can be configured in any of a variety of ways to allow the layers 110 to generate the alternative representation conditioned on the current output image, i.e., and not on any color values in the output image that have yet to be generated by the neural network system 100.

In some implementations, the initial neural network layers 110 are a fully convolutional neural network that is made up of multiple convolutional neural network layers that each preserve the spatial resolution of the input to the initial neural network layers 110. That is, the spatial resolution of the input to the initial neural network layers 110 and the output of each of the convolutional neural network layers have the same spatial resolution, i.e., have the same number of pixels as the output image, for example, they maybe padded, while the number of features generated for each pixel by the convolutional neural network layers can vary. However in implementations, throughout the processing, the features for each input position, i.e., at each pixel, at every layer in the network are split into multiple portions, with each corresponding to one of the color channels. Thus, the alternative representation generated by the initial neural network layers 110 may include a respective portion for each of the color channel values for the given pixel, and, when generating the score distribution for a given color channel, the output layers 120 may be configured to process the portion corresponding to the given color channel.

To ensure that the convolutional neural network layers are conditioned only on the already generated output values, each convolutional neural network layer is configured to apply a convolution that is masked such that the portion of the alternative representation corresponding to a given color channel for a given pixel is only generated based on (i) pixels in the output image that are before the pixel in the sequence and (in a color system) (ii) color channel data for the pixel for color channels before the given color channel in the order of color channels.

For the first convolutional layer, i.e., the layer that receives the current output image as input, the mask restricts the connections to a given pixel in the output feature map of the first convolutional layer to those neighboring pixels in the current output image that are before the given pixel in the sequence and to those colors in the corresponding pixel in the current output image that have already been generated.

For additional convolutional layers, the mask restricts the connections in a given pixel in the output feature map of the additional convolutional layer to those neighboring pixels in the input feature map to the additional convolutional layer that are before the given pixel in the sequence, to features corresponding to those colors in the corresponding pixel in the input feature map that have already been generated, and to features corresponding to the given color in the corresponding pixel in the input feature map.

The neural network system 100 can implement this masking in any of a variety of ways. For example, each convolutional layer can have a kernel with the corresponding weights zeroed out.

In some cases, the initial neural network layers 110 may include two stacks of convolutional neural network layers: a horizontal one that, for a given pixel in a given row, conditions on the color values already generated for the given row so far and a vertical one that conditions on all rows above the given row. In these cases, the vertical stack, which does not have any masking, allows the receptive field to grow in a rectangular fashion without any blind spot, and the outputs of the two stacks may be combined, e.g., summed, after each layer.

FIG. 1 illustrates an example "PixelCNN" model. As an enhancement to the system some or all of the initial, convolutional neural network layers 110 may have a gated activation function in place of a conventional activation function. In a gated activation function, the output of an element-wise non-linearity, i.e., of a conventional activation function, is element-wise multiplied by a gate vector that is generated by applying an element-wise non-linearity to the output of a convolution.

For example, when the element-wise non-linearity is tan h and the element-wise gating function is the sigmoid function, the output of the activation function z for a layer k may satisfy:

$$z = \tan h(W_{f,k} * x) \odot \sigma(W_{g,k} * x),$$

where $W_{f,k}$ is the main filter for the layer k, x is the layer input, * denotes a convolution, $\odot$ denotes element-wise multiplication, and $W_{g,k}$ is the gate filter for the layer k. Adding such a multiplicative function, i.e. the gate filter and activation, may assist the network to model more complex interactions.

In some implementations, the neural network input can include a high-level description of the desired content of the generated image that is represented as a latent vector.

That is, in some implementations, the generated image may be conditioned on a latent vector h. For example, the latent vector may comprise a representation that specifies a class of object that should appear in the generated image. During training h is presented together with a training image.

When the output image being generated is conditioned on a latent vector, some or all of the convolutional layers also condition the output of the activation function on the neural network input. For example, the non-linear function and the gating function may each take as input a combination of the corresponding convolution output and an input generated from the latent vector.

For example, when the element-wise non-linearity is tan h and the element-wise gating function is the sigmoid function, the output of the activation function z for the layer k satisfies:

$$z=\tan h(W_{f,k}*x+V_{f,k}^T h)\odot\sigma(W_{g,k}*x+V_{g,k}^T h),$$

where $V_{f,k}^T$ is a main learnable linear projection (of h to the main component of the activation function) for the layer k, h is the latent vector, and $V_{f,k}^T$ is a gate learnable linear projection (of h to the gate component of the activation function) for the layer k. In some cases, the conditioning vector is the same for all pixel generation steps of the sequence but may be pixel location dependent. This example shows use of both a gating function and conditioning on a latent vector but these may be implemented independently, i.e. the sigmoid function may be omitted when conditioning on a latent vector.

The above described system is an example of an autoregressive model in which the sample generated at every step is conditioned on a global context function. There are now described modifications to such a model which may be viewed as implementing meta-learning, in which the model learns to perform a task and in which the model parameters may then be fixed whilst the model is conditioned on one or a few new examples to generate a target output. Thus there is now described an example system in which, in broad terms, at the point of generating each value of a data item, for example each pixel value of an image, the convolutional neural network queries a memory.

Figure 2:
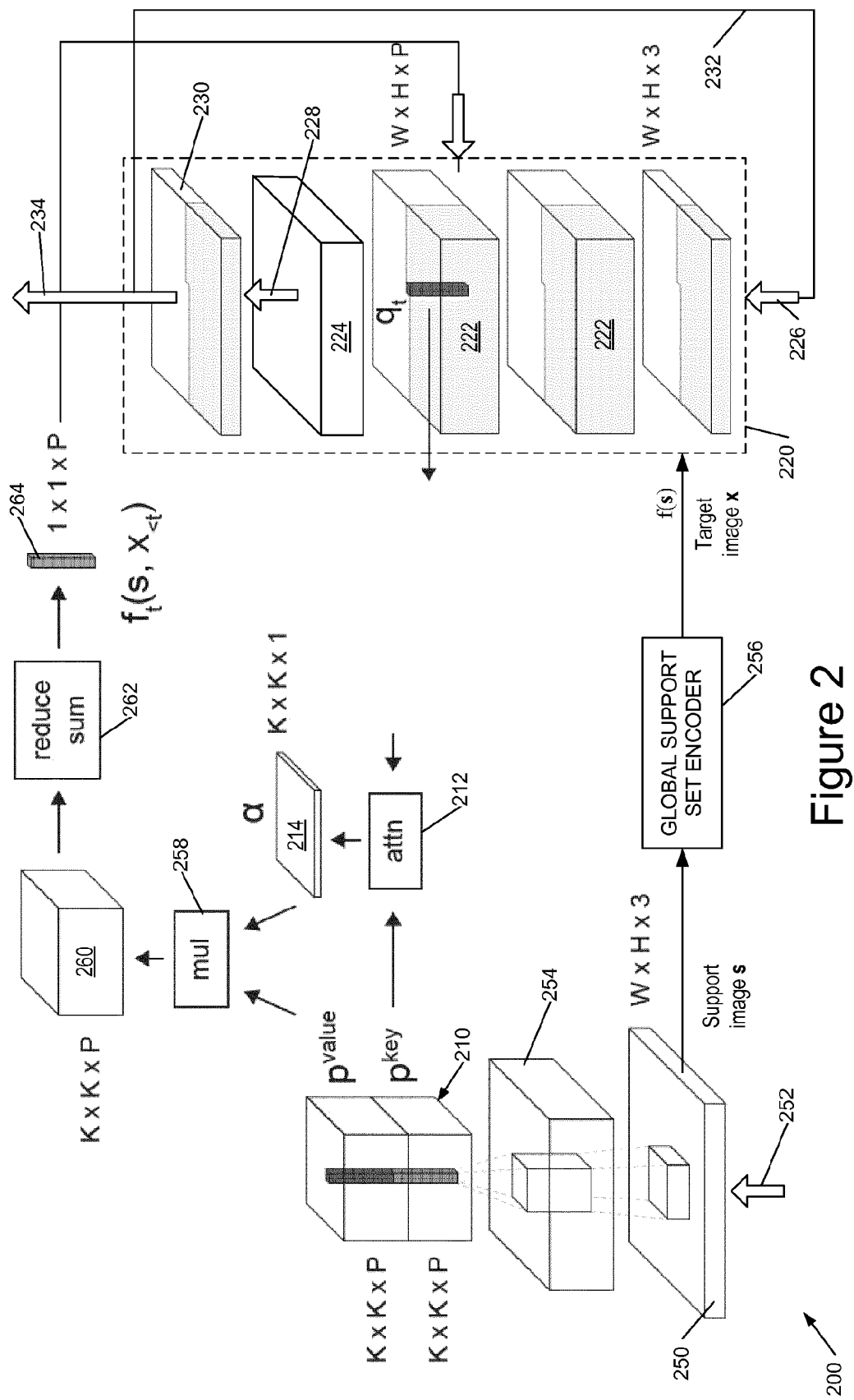
FIG. 2 shows an example of a neural network system including a soft attention mechanism.

Referring to FIG. 2, this shows an example of a neural network system 200 including a soft attention mechanism. The soft attention mechanism includes a support memory 210 and a soft attention subsystem 212. The neural network system 200 is an example of a system implemented as computer programs on one or more computers in one or more locations, in which the systems, components, and techniques described below can be implemented.

The system comprises an autoregressive convolutional neural network module 220, which may be similar to the PixelCNN neural network system previously described with reference to FIG. 1. Thus this may comprise a stack of convolutional neural network layers 222 (only two are shown in FIG. 2) followed by at least one output layer 224. The convolutional neural network layers 222 are configured to implement causal convolutions, for example by including one or masks as previously described. For example the stack of masked convolutional layers may take an e.g. W×H×1 or W×H×3 image as input 226 and may produce an e.g. W×H×1×256 or W×H×3×256 score distribution as output 228. The 256 possible values, or 256 values for each color channel, may be modelled with a softmax. Successive pixel values may be determined from the score distribution e.g. by sampling. An output image 230 is generated autoregressively, conditioned on previously generated pixels as shown by loop 232, and provided to output 234. Whilst pixel predictions for sample images are generated sequentially the convolutional neural network structure allows the system to be trained in parallel.

Some of the convolutional neural network layers 222 may be configured as gated convolutional layers, in particular to determine an output dependent upon an input from a layer beneath and a conditioning vector, again as previously described. For one or more of the layers the conditioning vector is derived from a context-sensitive attention mechanism, which may be represented mathematically as $f(s, x_{<t})$ where $f( )$ defines an encoding mechanism, s represents a set of support data items, for example a set of images, and $x_{<t}$ represents the sample, e.g. image, generated up to the current step t. For one or more of the layers the conditioning vector may include global context features $f(s)$. The weights of the autoregressive neural network module 220 are shared over t, that is they are the same for each generated value of a data item, e.g. each pixel value generated for a sample image.

The memory stores data from one or a few samples, which act as support data items used when generating the model output. More particularly the memory stores data encoding a set of support data patches, that is regions of data from the support data items. For example where the model is configured to generate an image from one or more sample images the support data patches may comprise regions of the image(s), which may be termed "textures". Where the model generates sound the support data patches may be derived from portions of a digitized series of values representing the sound in the time and/or frequency domain.

The system uses the support data patches to sequentially generate data item values such as pixel or sound values. The support data patches provide local context when generating the data item values, that is they provide context data to the autoregressive model, and this context data may change from one data item value generation step ("time" step) to another. The system may also have access to a set of globally encoded features from the support data item(s), that is features which may be the same for each step of generating a data item value.

The autoregressive convolutional neural network module 220 generates output data item values such as pixel values or sound signal values one at a time conditioned on previously generated data item values and local/global data from the support data item(s). During training the system learns to perform an operation based on the support data item(s). Merely by way of illustration such an operation may be to copy an image from a training set or to horizontally flip an image from a training set. During inference the system can then use one or a few examples of previously unseen support data item provided as an input to the system to perform the operation. The support data item(s) may thus define a target image, or other target sample from a learned distribution, which may be generated by the system. The convolutional neural network system 200 may further be conditioned on other features, for example features from text and/or image part keypoints or segmentation masks, as described in Oord et al (ibid) and in S. Reed et al. "Text- And Structure-Conditional PixelCNN". This may be implemented using the attention mechanism shown in FIG. 2.

The target sample, x, generated by the system is in this example the color output image 230, comprising a set of W×H×3 pixel values. Similarly each of S support set data items may comprise an input image 250 in this example a color image with W×H×3 pixel values; these may be provided via an input 252. The support set data items are encoded by local support set encoder such as a shallow convolutional neural network (CNN) 254. This may, for example, have only two layers. Because the CNN is shallow each hidden unit of the resulting feature maps may have a relatively small receptive field, for example corresponding to a 10×10 patch in a support image. In this way CNN 254 may encode texture information in the support images.

The output from CNN 254 comprises a set of K×K×2P spatial feature maps and this provides a set of spatially indexed key and value vectors, $p^{key}$ and $p^{value}$ which together make up support memory 210. A support memory constructed in this manner allows gradients to be backpropagated through the support memory to train parameters of the local support set encoder, CNN 254, by gradient descent.

The similarity of a query vector to a key vector can be used to query the memory and the value vector provides a corresponding output. The support memory effectively provides a mechanism for the CNN module to learn to use encoded patches (data regions) from the support data set when generating the target output x. To achieve this it is possible to use the same vector as both the key and value but using separate key and value vectors may provide additional flexibility. It is not necessary for the set of feature maps to have the same dimensions in the horizontal and vertical directions within the support image(s).

The support images may thus be encoded into the set of spatially indexed key and value vectors. This encoding may be performed on the support images in parallel. In some implementations the resulting S×K×K×2P feature maps may be reshaped into an SK²×2P matrix in which the first P channels are taken as patch key vectors and the second P channels are taken as patch value vectors (p=reshape(CNN (s), [SK²×2P]); $p^{key}$=p[:,0: P]; $p^{value}$=p[:, P: 2P]). Together these form the queryable support memory 210 which is used for generating the target output, in this example the target image. The support memory 210 may thus comprise temporary storage which, during generation of the target output, stores data provided by the learned encoding of the one or more support data items which are then present.

Data from CNN module 220 is used to query the support memory 210. More specifically a pixel query vector $q_t$ for a currently generated pixel value at iteration t should depend upon the pixel values generated so far $x_{<t}$ and upon any global context features $f(s)$. This can be achieved by taking an output from one of CNN layers 222 of the CNN module 220. This output may comprise a vector formed from the feature map outputs of the layer(s). The CNN layer 222 may have a W×H×P feature map output (and as described later the soft attention subsystem may provide a 1×1×P output) or the feature map output of (and input to) the CNN layer may be mapped to a P-component vector. In some implementations the CNN layer may be the middle layer. However a pixel query vector may be generated for each of multiple ones of the CNN layers, for querying memory 210 at multiple levels within CNN module 220. The global context features $f(s)$ may be generated from the support data set by a global support set encoder 256. The global support set encoder 256 may, for example, comprise one or more convolutional neural network layers and/or one or more fully connected layers, and may have an output spatial dimension of 1.

The pixel query vector is used to determine a soft attention query vector $\alpha_{tj}$ which may comprise a normalized set of scores each defining a respective matching between the pixel query vector $q_t$ and one of the supporting patches as represented by its key $p_j^{key}$. A score $e_{tj}$ defining such a matching may be determined by a non-linear function of a combination of $q_t$ and $p_j^{key}$. For example the non-linear function may be an element-wise tan h function and the combination may be a sum:

$$e_{tj}=v^T \tan h(q_t+p_j^{key})$$

where tan $h(q_t+p_j^{key})$ is a vector of length P, v is a learnable vector of length P (projecting tan $h(q_t+p_j^{key})$ to $e_{tj}$), $q_t$ relates to the current pixel, and $p_j^{key}$ more particularly j runs over the spatial locations of the supporting patches for each support image and has e.g. S×K×K values. Alternatively, for example, the non-linear function may be defined by a feedforward neural network jointly trained with the other system components. A normalized set of scores may then be defined as:

$$\alpha_{tj} = \frac{\exp(e_{tj})}{\sum_{j=1}^{SK^2} \exp(e_{tj})}$$

In broad terms the soft attention query vector $\alpha_{tj}$ represents the importance of supporting patch j to pixel t, and therefore implements a form of attention mechanism. In FIG. 2 $\alpha_{tj}$ is an output 214 of the soft attention subsystem 212, in the example with dimensions K×K×1, i.e. it has a value for each of the support patches for the currently processed pixel value.

An attention-controlled context function $f_t(s, x_{<t})$ may then be determined from a combination of the soft attention query vector $\alpha_{tj}$ and the support data patch value vectors $p^{value}$, for example by forming a product of $\alpha_{tj}$ and $p^{value}$:

$$f_t(s, x_{<t}) = \sum_{j=1}^{SK^2} \alpha_{tj} p_j^{value}$$

The attention-controlled context function may be determined by a context function module 258 which provides the attention-controlled context function 260 as an output, in the example of FIG. 2 with dimensions K×K×P. The attention-controlled context function may then be used to condition the generation of the current pixel value. Thus the K×K×P dimensions of $f_t(s, x_{<t})$ may be reduced to 1×1×P, for example by a reduce-sum operation 262, to provide an output vector 264 of length P representing $f_t(s, x_{<t})$. The reduce sum operation computes a sum of elements across the relevant dimensions.

As previously described the CNN layer 222 may have an output conditioned on a latent vector input as well as an input from the layer beneath. The 1×1×P vector representing $f_t(s, x_{<t})$ may provide such a conditioning input to the activation function of CNN layer 222. In some implementations the attention-controlled context function may be concatenated with global context features $f(s)$.

FIG. 2 illustrates an example neural network system for implementing the above-described functions but the described functions may be implemented in other ways without using the particular structure shown in FIG. 2.

In some implementations each supporting image may include one or more channels encoding relative position within the image. For example in addition to R, G and B color channels each pixel may have an x-position channel and a y-position channel each of which may be in the range [−1,1]. This allows explicit position information to be encoded into the spatial feature maps representing the support data patches.

In some implementations each supporting image may include a channel a label for the supporting image. For example with K support images each image may have a channel defining a 1-of-K label for each pixel of a support image. This provides patch encodings with information identifying the global context (support image) from which a patch was extracted. This may be useful, for example, when assembling patches from multiple different views of an object.

In some implementations the convolutional neural network module 220 is a multiscale CNN module as described in Scott Reed et al., "Parallel multiscale autoregressive density estimation" arXiv 1703.03664. In this case the dependencies on previous pixels $x_{<t}$ described above may be replaced by dependencies on previous groups of pixels x<g where g indexes a group of pixels and <g indicates all pixels in previous pixel groups. Thus rather than determine a score distribution representing P ($x_t|x_{<t}$, $f_t$(s, $x_{<t}$); θ) the system may determine a score distribution representing P($x_g|x_{<g}$, $f_g$(s, $x_{<g}$); θ).

Figure 3:
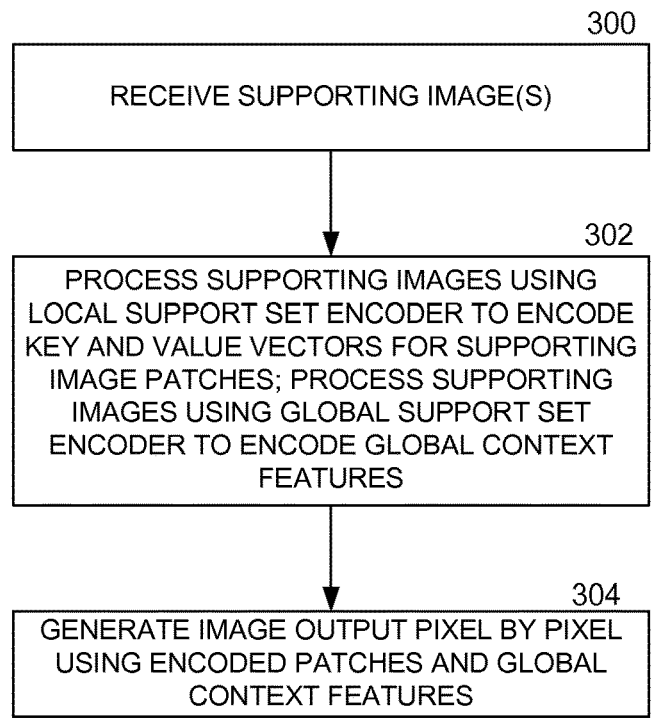
FIG. 3 is a flow diagram of an example process for generating an output image using the neural network system of FIG. 2.

FIG. 3 shows a flow diagram of a procedure for using the neural network system 200 of FIG. 2 for few-shot learning. In some implementations the system is first trained as described later and then parameters of the system are fixed. The trained system may then be used to implement few-shot learning as a form of inference, inducing a representation of a probability density distribution in the system by presenting the previously trained system with one or a few new examples. These new examples are received by the system as a support data set, for example as one or more new example images. In effect the system is trained to perform a task using the support data set, for example to copy the new example(s) or to process the new example(s) in some other way. The system then performs the same task on the new examples. The initial training can be considered a form of meta-learning.

Thus the example of FIG. 3 shows a flow diagram of a procedure for using the neural network system to generate an image. The procedure may be performed by a system of one or more computers located in one or more locations.

The neural network system receives one or more supporting images (300) and processes these using the local support set encoder, CNN 254 to encode these into a set of spatially indexed patch key and value vectors as previously described (302). The neural network system also processes the supporting images using the global support set encoder 256 to generate a set of global context features. The autoregressive convolutional neural network module 220 generates the output image pixel-by-pixel conditioned on the attention-controlled context function, which uses the soft attention mechanism to provide local patch attention features, and further conditioned on the global context features (304). More specifically for each current pixel value in turn the convolutional neural network module 220 generates a set of scores for the current pixel value, for example the current color pixel value, conditioned on the previously determined pixel values and on the local and global context features; these scores are then used to determine the current pixel value.

The generated set of scores for each pixel may further be conditioned on an additional data input, which may comprise data of a different type to that of the generated data item. For example the additional data input may comprise text and the generated data item may comprise pixel values of an image or a time series of amplitude or other values representing a sound signal. In another example the additional data may comprise action data defining an action to be performed by a mechanical e.g robotic agent. In this case the generated data item values may comprise pixel values of an image representing a predicted image frame which results from the agent performing the action. This additional data may be transformed to generate a latent feature vector, for example using one or more neural network layers such as one or more convolutional layers and/or an MLP (multilayer perceptron), and the convolutional neural network module 220 may be conditioned on the latent feature vector.

Figure 4:
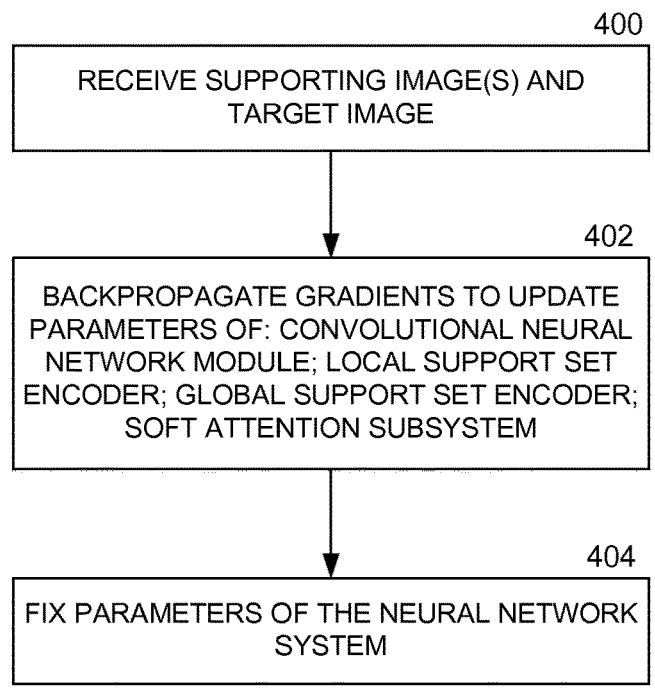
FIG. 4 is a flow diagram of an example process for training the neural network system of FIG. 2.

FIG. 4 shows an example procedure for training the neural network system of FIG. 2. This again may be performed by a system of one or more computers located in one or more locations.

The training procedure uses end-to-end supervised training. Thus the system receives one or more supporting images and a target output image (400) and processes the supporting images broadly as described above with reference to FIG. 3 to generate an output image. However since the output image that should be generated, i.e. the target output image, is known in advance the processing to generate pixel values, or in other implementations other sample values, can be performed in parallel; i.e. $x_{<t}$ is known in advance for all pixels.

A loss function is defined based on a difference between the generated output image and target output image, and stochastic gradient descent may be used to backpropagate gradients through the system to update the system parameters (402). The learned system parameters may comprise the weights of the convolutional neural network module 220 weights, weights of the local and global support set encoders, and parameters of the soft attention subsystem. Once the system parameters have been learned they are fixed (404) prior to using the system for few-shot learning as inference.

Merely by way of illustration, in one example application the system may be trained to horizontally flip an image by presenting the system with examples each comprising a support image which is a flipped version of a target image. In an illustrative example of such a system processing 48×48 pixel images the global support set encoder 256 comprises a 5×5 convolutional neural network layer followed by a sequence of 3×3 convolutional and max-pooling layers until the output spatial dimension is 1. The CNN module 220 has 16 layers with 128-dimensional feature maps and skip connections each conditioned on the global context features and the upper 8 layers also conditioned on the attention-controlled context features.

Figure 5:
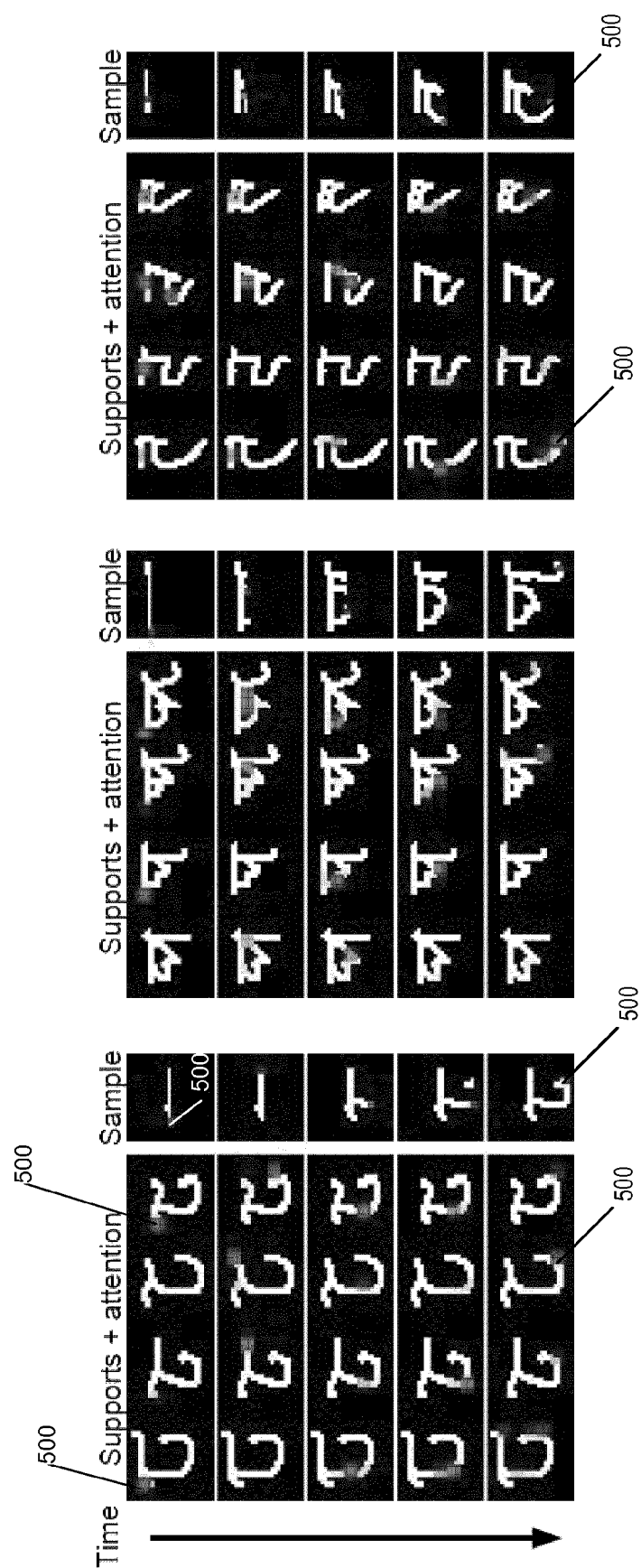
FIG. 5 illustrates operation of the neural network system of FIG. 2.

In another example application the system may be trained to copy characters from the Omniglot dataset by presenting the system with examples each comprising one or more support images which the system is trained to copy to provide the target image. A similar system architecture may be employed as described for image flipping, but with a reduced number of layers because of the smaller image size (26×26 binarized pixels). FIG. 5 shows three examples of the use of such a system to generate pixels for an output image, in raster order, from a set of four support images for each example. The overlaid patches 500 indicate the attention read head weights at, illustrating that as each part of a character is generated the system attends to corresponding regions of the support set.

Some examples of the neural network system which generate an image have been described but the attention mechanism used is not limited to image generation and may also be employed, for example, for sound generation. Thus a 1D signal may be modelled autoregressively using a masked i.e. causal convolutional neural network in a similar manner to that described for images. In this case the autoregressive CNN module 220 may be a 1D CNN as described in A. van den Oord et al. "WaveNet: A generative model for raw audio" arXiv 1609:03499. The support data set may comprise S 1D time sequences of signal values, CNN 254 may be a 1D CNN, and for the soft attention query vector $\alpha_{tj}$ j may run from 1 to S×K. The system may determine a score distribution over possible audio values for each time instance and audio samples may be generated by sampling from the distribution or selecting an audio sample with the highest score. An audio sample may represent a signal value of an audio waveform in either the time or time-frequency domain. A generated sequence of audio data may represent speech in a natural language or e.g. a piece of music. For text to speech conversion the audio may be conditioned on the text for conversion, more particularly on an encoded, latent feature vector representation of the text.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A neural network system implemented on one or more computers and for generating an output image, the neural network system comprising:
    a causal convolutional neural network configured to generate an output image by, at each of a plurality of iterations, generating a value of a pixel of the output image conditioned upon values of pixels of the output image previously generated at previous iterations;
    a support memory configured to store data representing a set of support data patches for generating the output image, wherein each support data patch in the set of support data patches corresponds to a respective example image that is different from the output image and comprises features generated by a neural network by processing at least a part of the corresponding example image that is different from the output image; and
    a soft attention subsystem configured to, at each of the plurality of iterations, determine a soft attention query vector from the previously generated values of the pixels of the output image, determine a respective key for each of the support data patches, and combine (i) the soft attention query vector determined from the previously generated values of the pixels of the output image and (ii) the respective keys for each of the support data patches that correspond to respective example images that are different from the output image to determine a set of scores for the support data patches for generating the value of the pixel of the output image at the iteration; and
    wherein one or more layers of the causal convolutional neural network are conditioned upon a combination of the support data patches weighted by the scores.

2. The neural network system of claim 1 wherein the soft attention query vector comprises a set of features from a layer of the causal convolutional neural network.

3. The neural network system of claim 1 wherein the support data patches each have a respective support data patch value encoding content of the support data patch, wherein the soft attention mechanism is configured to, at each of the plurality of the iterations, determine an attention-controlled context function from a combination of the support data patch values weighted by the scores, and wherein one or more layers of the causal convolutional neural network are conditioned upon the attention-controlled context function.

4. The neural network system of claim 1 wherein the iteratively generated values of the pixels of the output image define respective positions associated with the values of the pixels of the output image, and wherein the support data patches span a range of said positions.

5. The neural network system of claim 1 wherein the features are generated by a convolutional neural network encoding the corresponding example images.

6. The neural network system of claim 1 wherein the corresponding example images each comprise a plurality of data elements and include a channel encoding relative positions of the data elements.

7. The neural network system of claim 1 wherein the support data patches comprise encodings of a plurality of support data items, and wherein the support data patches each include a channel identifying a respective support data item or set of support data items.

8. The neural network system of claim 1 wherein the one or more layers of the causal convolutional neural network are further conditioned upon global feature data, wherein the global feature data defines global features for the output image, and wherein the global feature data is derived from one or more of the support data patches.

9. The neural network system of claim 8 wherein the support data patches comprise encodings of one or more support data items, the system further comprising an input to receive the one or more support data items and an encoder to encode the one or more support data items into the global feature data, wherein the global feature data represents one or more features of the one or more support data items.

10. The neural network system of claim 1 wherein the causal convolutional neural network comprises one or more causal convolutional network layers coupled to an output layer, wherein the output layer is configured to generate an output defining a distribution of predicted values for the pixel of the output image at an iteration, the neural network system further comprising a selection module to select a value of the pixel of the output image for a current iteration dependent upon the distribution of predicted values, and to provide the selected value for the causal convolutional neural network to use in a subsequent iteration.

11. The neural network system of claim 1 wherein the causal convolutional neural network is configured to generate successive groups of values for the output image, wherein the successive groups of values are at successively higher resolution, and wherein the causal convolutional neural network is configured to iteratively generate values of the output image for one group conditioned upon previously generated values of the output image for one or more previously generated lower resolution groups.

12. The neural network system of claim 1 wherein the causal convolutional neural network is further conditioned on an encoding of data of a different type to that of the output image.

13. A method of training a neural network system to encode a probability density estimate for a output image, the method comprising:
training a convolutional neural network to iteratively generate a succession of values of pixels of a output image conditioned upon previously generated values of the output image, wherein the training encodes a probability density estimate for the output image in weights of the convolutional neural network; wherein the training further comprises:
encoding support data from input data, the input data defining one or more examples of a target image for the neural network system, wherein each example is an example image that is different from the output image, to generate encoded support data that comprises one or more support patches for each of the examples by processing each of the one or more examples using a neural network to generate features of the one or more examples;
encoding a combination of local context data derived from the previously generated values of the output image, and the encoded support data comprising the features of the one or more examples, to determine an attention-controlled context function that assigns a respective weight to each of the one or more support patches for each of the examples, and
conditioning one or more layers of the convolutional neural network upon the attention-controlled context function.

14. A method as claimed in claim 13 further comprising:
storing the encoded support data in memory coupled to the convolutional neural network; and
querying the stored encoded support data using the attention-controlled context function.

15. A method as claimed in claim 13 wherein determining the attention-controlled context function comprises learning a scoring function matching the local context data with the support data.

16. A method as claimed in claim 13, further comprising using the encoded probability density estimate to generate values for a further output image sampled from or predicted by the encoded probability density estimate.

17. One or more non-transitory computer-readable storage media storing instructions that when executed by one or more computers cause the one or more computers to implement a neural network system for generating an output image, the neural network system comprising:
a causal convolutional neural network configured to generate an output image by, at each of a plurality of iterations, generating a value of a pixel of the output image conditioned upon values of pixels of the output image previously generated at previous iterations;
a support memory configured to store data representing a set of support data patches for generating the output image, wherein each support data patch in the set of support data patches corresponds to a respective example image that is different from the output image and comprises features generated by a neural network by processing at least a part of the corresponding example image that is different from the output image; and
a soft attention subsystem configured to, at each of the plurality of iterations, determine a soft attention query vector from the previously generated values of the pixels of the output image, determine a respective key for each of the support data patches, and combine (i) the soft attention query vector determined from the previously generated values of the output image and (ii) the respective keys for each of the support data patches that correspond to respective example images that are different from the output image to determine a set of scores for the support data patches for generating the value of the pixel of the output image at the iteration; and wherein one or more layers of the causal convolutional neural network are conditioned upon a combination of the support data patches weighted by the scores.

* * * * *